Sept. 15, 1953     I. KALIKOW ET AL     2,652,507
ALTERNATOR AND EXCITER COMBINATION
Filed Jan. 5, 1952
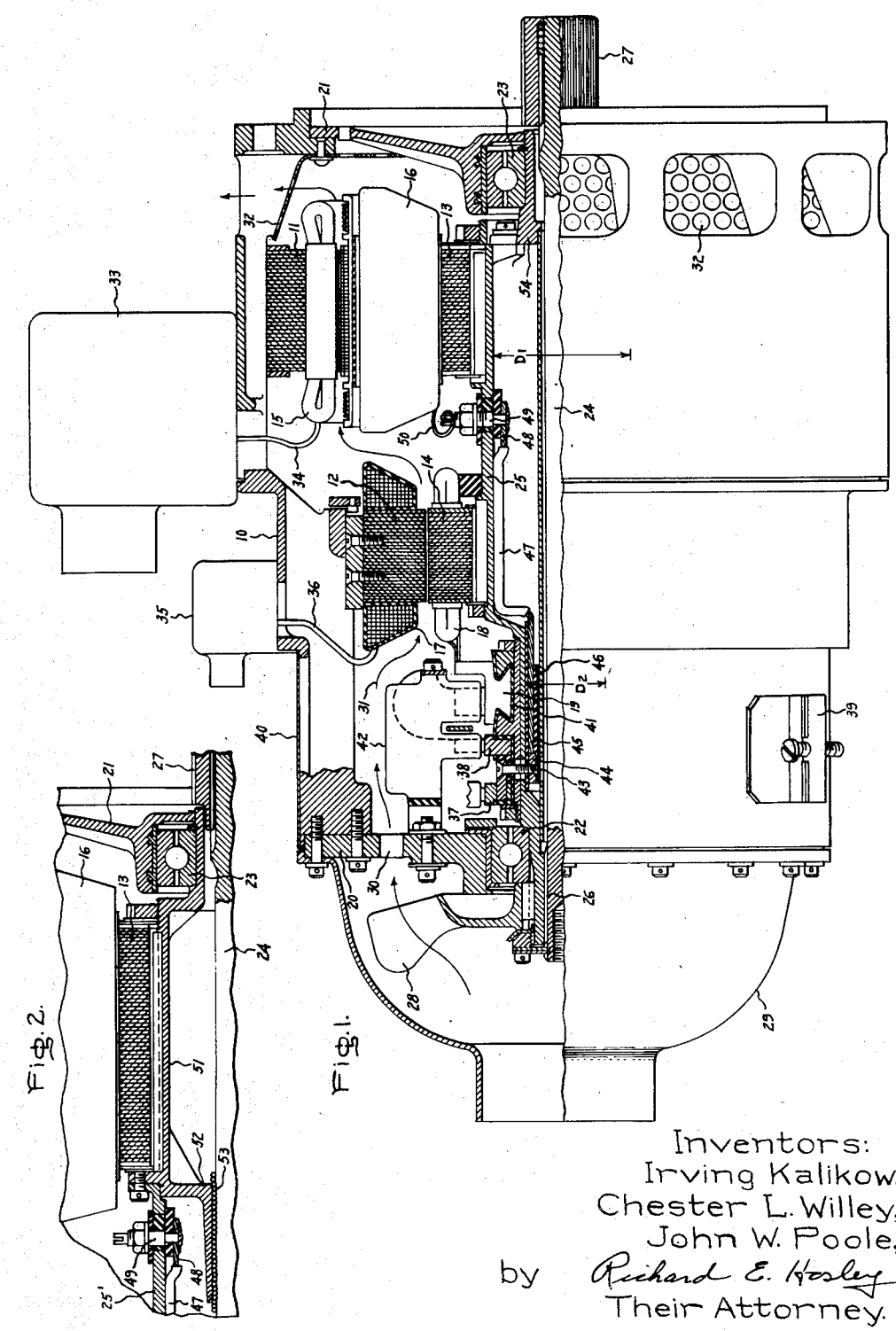
Inventors:
Irving Kalikow,
Chester L. Willey,
John W. Poole,
by Richard E. Hosley
Their Attorney.

Patented Sept. 15, 1953

2,652,507

UNITED STATES PATENT OFFICE 2,652,507

ALTERNATOR AND EXCITER COMBINATION

Irving Kalikow, Swampscott, and Chester L. Willey and John W. Poole, Lynn, Mass., assignors to General Electric Company, a corporation of New York Application January 5, 1952, Serial No. 265,108

4 Claims. (Cl. 310—112)

Our invention relates to dynamoelectric machines and has significance in connection with an alternator exciter combination contained in a single frame.

There have heretofore been problems in connection with light weight alternator exciter combinations where long shaft length introduces problems of critical speed, excess weight, and inaccessibility to parts which have to be replaced from time to time.

It is an object of the present invention to provide simple means for overcoming the above-mentioned difficulties.

A further object of the present invention is to provide an alternator exciter combination located in a single frame and having a single access location for servicing commutator and collector brushes.

A still further object of the present invention is to provide an alternator exciter combination characterized by weight reduction, production economies, and increased natural frequency and operating safety of the shaft assembly.

In accordance with our invention, we eliminate problems of excess weight, of particular importance where the equipment is airborne, by providing a large hollow and stepped shaft which also serves to increase the natural frequency of the set thereby raising the speed at which it may be operated without reaching a critical speed, and the hollow shaft also serves as a useful conduit for leads required to run from one end of the machine to another to allow commutator and collector brushes to be located together adjacent a single end of the machine.

The features of our invention which we believe to be novel are set forth with particularity in the appended claims. Our invention itself, however, both as to its organization and method of operation, together with further objects and advantages thereof, may best be understood by reference to the following description taken in connection with the accompanying drawing in which Fig. 1 is a side elevational view with the upper half in section and showing an alternator exciter combination constructed in accordance with the invention; and Fig. 2 shows a modification, being a sectional view of a portion of a machine constructed otherwise in accordance with Fig. 1.

Referring now to Fig. 1, I have shown a dynamoelectric machine structure comprising a single frame 10 having secured thereto a first stator core portion 11 and an axially spaced second stator core portion 12 each designed to cooperate electrodynamically with a different one of respective first and second rotor core portions 13 and 14. In the illustrated embodiment, the first stator rotor combination is that of an alternator with its stator core having a distributed type A. C. armature winding 15 and its rotor core provided with salient pole D. C. exciting windings 16, and the second stator-rotor combination is that of a D. C. exciter generator with its stator core having salient pole D. C. exciting windings 17 and its rotor core provided with an armature winding 18 connected to a commutator 19.

The frame 10 has end flanges 20 and 21 serving as bearing housings for antifriction bearings 22 and 23, respectively, and the structure has a relatively flexible shaft member and a relatively rigid shaft member respectively comprising an inner torsional shaft 24 and an outer quill shaft 25 with the two concentrically arranged and connected together by splines 26 at the driving end of the inner shaft with the other or driven end of the inner shaft provided with a spur gear 27 so that the entire unit may be driven by a prime mover engine (not shown).

The inner shaft is supported by its connection to the outer and the outer shaft is supported in the bearings 22 and 23.

Generally, it is desirable to make the inner shaft of steel because of the elastic properties of that material. We prefer to also make the outer shaft 25 of steel because while it could be made of one of the light metals such as magnesium we have found that such metals present a hazard in that they melt out when a bearing fails and catch fire, that light weight can be obtained by using a large stepped hollow shaft, as hereinafter explained, without sacrificing the safety of an all steel construction.

Although any ventilation scheme, or none at all, is optional insofar as the present invention is concerned, I have shown outer shaft 25 carrying an axial discharge fan 28 designed to draw air through a duct 29 and discharge it through apertures such as 30 into the machine as indicated by arrows 31, and around the exciter field coils 17, and around the alternator field coils 16 and out through screen apertures 32 at the other end of the machine.

In the illustrated embodiment the machine is shown provided with a junction box 33 for the main output leads 34 connected to the alternator armature, and with a junction box 35 for leads 36 used for providing D. C. field excitation for the exciter.

In accordance with the present invention the hollow outer shaft 25 comprises a thin wall of variant diameter having a large inner diameter $D_1$ under the punchings compared, for example, to a smaller diameter $D_2$ under the commutator 19. This results in a stiff outer shaft permitting a higher operating speed without reaching a critical value than would be the case if the outer shaft was of a constant relatively small diameter, and it also has the further advantage of making the overall construction lighter (of particular importance if the machine is to be airborne) because excess material, which we have found to be surplus from the standpoint of requisite magnetic properties, can be removed from the center of the punchings of the rotors.

Also in accordance with the present invention and as hereafter more fully explained, the leads for the salient pole rotor windings 16 are taken through this large hollow shaft to slip rings 37—38 which are located adjacent commutator 19 and adjacent the driving end of the inner shaft so that all brushes and brush holders are at what might be called the outboard end of the machine, easily accessible after loosening a single clamp 39 and removing a single cover 40.

The slip rings 37—38 are insulated from each other and form the segments of commutator 19 and all of these collector parts are insulated from shaft 25 by insulation 41.

Since the slip rings are fed from the commutator brushes, the brush holder for one polarity at the commutator need not be insulated from the brush holder for one slip ring, and therefore I have shown a common brush holder structure 42 for the brush contacting slip ring 38 and for the single commutator brush location shown in the drawing. If desired, of course, at any particular location the slip ring brush can be insulated from the commutator brush and the two brushes connected together through a regulating control system (not shown).

The two leads from the rotor field coils 16 to slip rings 37—38 are presumed similar to one another though only one is shown, terminating at one end in a connection screw 43 electrically and mechanically associated with slip ring 37. Screw 43 has a connecting lug 44 and lead conductor 45 extends therefrom in a first insulation sleeve 46 within the commutator carrying portion of the outer shaft and then extends along the larger inner diameter $D_2$ through an insulation sleeve 47 to a connecting lug 48 secured by a locking nut assembly 49 which is insulated from but passes out through the shaft 25. The lead ends in a potrion 50 connecting the locking nut assembly 49 to one terminus of the wire used for the field coils 16. The sleeves 46 and 47 may be made of glass or of treated glass cloth or other insulation material and we have found it preferable to install the harness made up of these conductors and sleeves by cementing the sleeves to the inner diameters of the outer shaft before the conductor ends are brazed on the one hand to lugs such as lug 44 at connection screw 43, and on the other hand to lugs such as lug 48 at the locking nut assembly 49. In order to thus place the wiring harness within the shaft 25, this hollow shaft is, during assembly, open at one end and is later completed by bolting on a short stub shaft 54 to take the bearing 23. Alternatively, this stub shaft can be made much longer and hollow and stepped as indicated by the part 51 in Fig. 2 in which like parts are numbered the same as in Fig. 1. With the arrangement of Fig. 2, the outer shaft indicated at 25' is much shorter, being bolted to the stub shaft 51 at a point between the axial center of the alternator and the axial center of the exciter. For longer machines this has an advantage because the hollow shaft assembly can be manufactured more readily in short sections rather than with one long hollow piece. There are other advantages, to the modification of Fig. 2, because the balancing problem is made easier, since each of the rotating masses can be balanced separately, then assembled together. Further, the design of Fig. 2 permits greater standardization because it is possible to use a standard exciter shaft assembly and bolt on alternator ratings as required. In addition, the wiring harness can be inserted and affixed with less difficulty in the shorter section (25' of Fig. 2) and the sectional construction makes it possible to get a central support for the inner shaft, as indicated in Fig. 2 where it is seen that a flange portion 52 of hollow section 51 provides a journal bearing surface for inner shaft 24. As shown, these two members may be separated by turns of asbestos cord 53 to act as a flexural vibration damper between the inner shaft and its supporting member.

There is thus provided a device of the character described capable of meeting the objects hereinabove set forth. With the arrangement of the invention, light weight requirements are met without sacrificing safety, the natural frequency of the machine is increased and all collector and commutator brushes are made accessible at a single location.

While we have illustrated and described particular embodiments of our invention, modifications will obviously occur to those skilled in the art. We desire it to be understood, therefore, that our invention is not to be limited to the particular arrangements disclosed, and intend in the appended claims to cover all modifications which do not depart from the true spirit and scope of our invention.

What we claim as new and desire to secure by Letters Patent of the United States is:

1. In a dynamoelectric machine, the combination of a frame having end portions forming bearing housings, bearings in said housings, a hollow shaft having an enlarged portion adjacent one end and a smaller portion adjacent the other end and supported by said bearings, a first rotor core portion positioned on said enlarged shaft portion and having a winding, a second rotor core portion positioned on said enlarged shaft portion and having a winding, current collector members for said windings positioned on said smaller shaft portion, and electrical connections between at least one of said current collector members and at least one of said windings passing through said hollow shaft, said frame having an opening formed therein communicating with all of said current collector members.

2. An alternator-exciter combination comprising an outer frame having flange portions forming bearing housings, bearings in said housings, a thin walled hollow shaft having an enlarged portion adjacent one end and a substantially smaller portion adjacent the other end and supported by said bearings, an exciter rotor comprising punchings having a large inner diameter mounted on said enlarged shaft portion and having a commutated armature winding, an alternator rotor comprising punchings having a large inner diameter mounted on said enlarged shaft portion axially spaced from said exciter rotor and having salient pole field windings, slip rings located on said smaller shaft portion and connected to said alternator field winding, a commutator located on said smaller shaft portion and connected to said armature winding, said connections between said slip rings and said alternator field winding passing through said hollow shaft, and a pair of unitary brush holders each operative for one slip ring and for one commutator brush location, said outer frame having an opening formed therein communicating with both said slip rings and said commutator.

3. An alternator-exciter combination comprising an outer frame having flange portions forming bearing housings, bearings in said housings, a thin walled hollow shaft having an enlarged portion adjacent one end and a substantially smaller portion adjacent the other end and supported by said bearings, an exciter rotor comprising punchings having a large inner diameter mounted on said enlarged shaft portion and having a commutated armature winding, an alternator rotor comprising punchings having a large inner diameter mounted on said enlarged shaft portion axially spaced from said exciter rotor and having salient pole field windings, slip rings located on said smaller shaft portion and connected to said alternator field winding, a commutator located on said smaller shaft portion and connected to said armature winding, a pair of unitary brush holders each operative for one slip ring and for one commutator brush location, said outer frame having an opening formed therein communicating with both said slip rings and said commutator, leads electrically connecting said alternator rotor field winding with said slip rings and passing through said hollow shaft, screw connectors respectively, mechanically and electrically associated with said slip rings and passing through said smaller shaft portion wall and respectively electrically connected to one end of said leads, and locking nut assemblies electrically associated with said alternator field windings and passing through said enlarged shaft portion wall and respectively electrically connected to the other ends of said leads.

4. In a dynamoelectric machine structure, the combination of a frame having end portions forming bearing housings, bearings in said housings, a hollow shaft assembly having an enlarged portion and a smaller portion and supported by said bearings, a first rotor core portion having an armature winding located on said enlarged shaft portion, a second rotor core portion having salient pole windings located on said enlarged shaft portion and axially spaced from said first rotor core portion, a commutator located on said smaller shaft portion and connected to said armature winding, slip rings located on said smaller shaft portion and connected to said salient pole windings, said hollow shaft assembly comprising a first part mounting one of said rotor core portions and said commutator and slip rings, and a stub shaft extension mounting the other of said rotor core portions and having a reduced diameter end portion supported by one of said bearings, said frame having an opening formed therein communicating with both said slip rings and said commutator.

IRVING KALIKOW.
CHESTER L. WILLEY.
JOHN W. POOLE.

References Cited in the file of this patent

UNITED STATES PATENTS

| Number | Name | Date |
|---|---|---|
| 1,266,303 | Neuland | May 14, 1918 |
| 1,472,588 | H'Doubler | Oct. 30, 1923 |
| 1,764,714 | Boykow | June 17, 1930 |
| 2,364,599 | Burrus | Dec. 12, 1944 |
| 2,540,099 | Christian | Feb. 6, 1951 |

FOREIGN PATENTS

| Number | Country | Date |
|---|---|---|
| 22,428 | Great Britain | Oct. 18, 1905 |
| 114,812 | Switzerland | Nov. 1, 1924 |
| 585,279 | France | Dec. 6, 1924 |